US010060329B2

(12) United States Patent
Murata et al.

(10) Patent No.: US 10,060,329 B2
(45) Date of Patent: Aug. 28, 2018

(54) VEHICLE AND METHOD OF CONTROLLING THE VEHICLE

(71) Applicant: TOYOTA JIDOSHA KABUSHIKI KAISHA, Toyota-shi, Aichi-ken (JP)

(72) Inventors: Takashi Murata, Kasugai (JP); Shingo Kato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 15/123,380

(22) PCT Filed: Mar. 6, 2015

(86) PCT No.: PCT/IB2015/000283
§ 371 (c)(1),
(2) Date: Sep. 2, 2016

(87) PCT Pub. No.: WO2015/140615
PCT Pub. Date: Sep. 24, 2015

(65) Prior Publication Data
US 2017/0067388 A1    Mar. 9, 2017

(30) Foreign Application Priority Data

Mar. 19, 2014  (JP) ................................ 2014-056574

(51) Int. Cl.
*F01P 7/16*  (2006.01)
*F01P 7/12*  (2006.01)
(Continued)

(52) U.S. Cl.
CPC .............. *F01P 7/16* (2013.01); *B60K 11/085* (2013.01); *B60L 1/02* (2013.01); *F01P 7/12* (2013.01);
(Continued)

(58) Field of Classification Search
CPC ...... B60K 11/085; B60L 1/02; B60L 2240/36; B60Y 2200/92; B60Y 2300/194;
(Continued)

(56) References Cited

U.S. PATENT DOCUMENTS 6,555,927 B1 * 4/2003 Suzuki ................... B60K 6/365
290/34
9,303,549 B2 * 4/2016 Chellan ..................... F01P 7/10
(Continued)

FOREIGN PATENT DOCUMENTS

JP      2007-22297 A    2/2007
JP      2008-126970 A   6/2008
(Continued)

*Primary Examiner* — Jerrah Edwards
(74) *Attorney, Agent, or Firm* — Oliff PLC

(57) ABSTRACT

A vehicle has a front grille, engine, engine compartment, power storage device, temperature sensor, shutter, heater and controller. The device can be electrically charged from an external power supply. The temperature sensor detects engine coolant temperature. The shutter is disposed in a transfer pathway of air drawn into the engine compartment via the front grille, and is switched between closed and open states. The heater is able to generate heat when receiving the electric power, raising the coolant temperature. The controller starts the engine when the coolant temperature is lower than a startup threshold value, drives the heater when the coolant temperature is lower than a first threshold value equal to or higher than the startup threshold value, until the coolant temperature becomes equal to or higher than the first threshold value, and drives the shutter to place the shutter in the closed state while the heater is driven.

3 Claims, 6 Drawing Sheets

(51) Int. Cl.
  *F02N 19/10* (2010.01)
  *B60K 11/08* (2006.01)
  *B60L 1/02* (2006.01)
  *G05D 23/19* (2006.01)
  *F02N 11/08* (2006.01)

(52) U.S. Cl.
  CPC ........... *F02N 19/10* (2013.01); *G05D 23/19* (2013.01); *B60L 2240/36* (2013.01); *B60Y 2200/92* (2013.01); *B60Y 2300/194* (2013.01); *B60Y 2400/302* (2013.01); *F01P 2037/02* (2013.01); *F01P 2050/24* (2013.01); *F01P 2060/18* (2013.01); *F02N 11/0814* (2013.01); *F02N 2200/023* (2013.01); *F02N 2200/061* (2013.01); *F02N 2200/062* (2013.01); *F02N 2200/063* (2013.01); *Y10S 903/904* (2013.01)

(58) Field of Classification Search
  CPC ........... B60Y 2400/302; F01P 2037/02; F01P 2050/24; F01P 2060/18; F01P 7/12; F01P 7/16; F02N 11/0814; F02N 19/10; F02N 2200/023; F02N 2200/061; F02N 2200/062; F02N 2200/063; G05D 23/19; Y10S 903/904
  See application file for complete search history.

(56) References Cited

U.S. PATENT DOCUMENTS

| | | |
|---|---|---|
| 2010/0147611 A1 | 6/2010 | Amano et al. |
| 2011/0178665 A1* | 7/2011 | Yoshioka .............. B60W 10/06 701/22 |
| 2014/0123917 A1* | 5/2014 | Chellan .................... F01P 7/10 123/41.04 |
| 2015/0149043 A1 | 5/2015 | Macfarlane et al. |

FOREIGN PATENT DOCUMENTS

| | | |
|---|---|---|
| JP | 2010-111277 A | 5/2010 |
| JP | 2011-98596 A | 5/2011 |
| JP | 2012-246790 A | 12/2012 |
| WO | 2012/059663 A1 | 5/2012 |

* cited by examiner

VEHICLE AND METHOD OF CONTROLLING THE VEHICLE

BACKGROUND OF THE INVENTION

1. Field of the Invention

The invention relates to a vehicle capable of moving using output of a power storage device, and a method of controlling the vehicle.

2. Description of Related Art

A vehicle (so-called hybrid vehicle) on which an engine and a battery assembly are provided is able to move using output of the battery assembly, without starting the engine. In the hybrid vehicle, when the temperature of a coolant of the engine is lower than a startup threshold value, the engine is started.

According to a technology as described in Japanese Patent Application Publication No. 2008-126970 (JP 2008-126970 A), when a battery assembly (battery) provided on a vehicle is charged with electric power supplied from a household power supply, electric power is supplied from the household power supply to a block heater. Then, the block heater generates heat, so as to heat the coolant of the engine.

SUMMARY OF THE INVENTION

When the vehicle starts moving after the battery assembly is charged with electric power from the household power supply, as in the system of JP 2008-126970 A, the engine is started if the temperature of the coolant of the engine is lower than the startup threshold value. If the engine is started as described above, even though the vehicle is able to keep moving using the output of the battery assembly, after charging of the battery assembly, the driver or passenger may feel uncomfortable or strange.

If the coolant is heated, the temperature of the coolant can be elevated to be equal to or higher than the startup threshold value, and the vehicle can start moving without starting the engine. While the block heater is used for heating the coolant of the engine in the system of JP 2008-126970 A, the purpose of heating the coolant is to reduce the warm-up time of the engine, but not to cause the vehicle to start moving without starting the engine.

In the meantime, the temperature of the coolant is not likely to be elevated only by heating the coolant using the heater. More specifically, when the coolant is heated, heat of the coolant is likely to be released to the outside of the vehicle, passing through a front grille provided at the front of an engine compartment. Therefore, the temperature of the coolant is not likely to be elevated even if the coolant is heated, and electric power supplied to the heater is likely to be increased so as to make the temperature of the coolant equal to or higher than the startup threshold value.

The invention was developed in view of the above problem, and provides a vehicle and a method of controlling the vehicle, which make it easier to heat a coolant of an engine, and make it less likely or unlikely to start the engine during moving the vehicle after charging of a battery assembly is completed.

A vehicle according to one aspect of the invention includes a front grille, an engine, an engine compartment, a power storage device, a temperature sensor, a shutter, a heater, and a controller. The engine is a power source for moving the vehicle. The power storage device is a power sources for a motor that moves the vehicle. The engine is housed in the engine compartment. The power storage device is adapted to be charged with electric power from an external power supply. The external power supply is provided outside the vehicle. The temperature sensor is configured to detect a temperature of a coolant of the engine. The shutter is disposed in a transfer pathway of air drawn into the engine compartment via the front grille. The shutter is configured to be switched between a closed state and an open state. The closed state is a state in which the transfer pathway is closed, and the open state is a state in which the transfer pathway is open. The heater is configured to generate heat by receiving electric power from the external power supply, so as to raise the temperature of the coolant.

The controller is configured to drive the heater until the temperature of the coolant becomes equal to or higher than a first threshold value when the temperature of the coolant is lower than the first threshold value. The first threshold value is equal to or higher than a startup threshold value. The startup threshold is a temperature of the coolant at which the engine is started. Then, the controller is configured to drive the shutter so as to place the shutter in the closed state while the heater is driven.

The controller drives the shutter to place it in the closed state while the heater is being driven, namely, during a period from the start of driving of the heater to the end of driving of the heater. Therefore, the shutter may be driven into the closed state when driving of the heater is started. Also, the shutter may be driven into the closed state after driving of the heater is started.

With the shutter thus driven into the closed state while the heater is driven, heat of the coolant heated by the heater is less likely or unlikely to be released to the outside of the vehicle, passing through the transfer pathway of air as described above. This makes it easy to raise the temperature of the coolant, by driving the heater. If the temperature of the coolant can be easily elevated, excessively large electric power need not be supplied to the heater. Namely, power consumption by the heater can be reduced.

After the power storage device is charged with electric power from the external power supply, the vehicle is able to move, using the output of the power storage device. By driving the heater and making the temperature of the coolant equal to or higher than the first threshold value, it is possible to prevent the engine from being started due to reduction of the temperature of the coolant, when the vehicle starts moving. Namely, the vehicle can start moving, without starting the engine.

The vehicle of this invention is able to move in a first mode and a second mode. In the first mode (which is a CD mode or EV mode as will be described later), the vehicle moves using the power storage device, when the SOC of the power storage device is higher than a reference value. In the second mode (which is a CS mode or HV mode as will be described later), the vehicle moves using the engine and the power storage device, so that the SOC varies within a predetermined range that is equal to or lower than the reference value.

In the vehicle according to the above aspect of the invention, the controller may be configured to keep the shutter in the closed state until the temperature of the coolant becomes equal to or higher than a second threshold value, when the shutter has been driven so as to be placed in the closed state. The second threshold value may be higher than the first threshold value. While driving of the heater is finished when the temperature of the coolant becomes equal to or higher than the first threshold value, the shutter is kept in the closed state even after driving of the heater is finished, since the second threshold value is higher than the first threshold value. After driving of the heater is finished, the vehicle can start moving using the output of the power storage device, as described above, however, the shutter may be kept in the closed state even after the vehicle starts moving.

Once the vehicle starts moving, wind caused by moving is generated. With the shutter kept in the closed state, the wind caused by moving is less likely or unlikely to pass through the front grille and flow into the engine compartment, and the coolant temperature is less likely or unlikely to be reduced. Accordingly, during moving the vehicle, the coolant temperature is less likely or unlikely to be lower than the startup threshold value, and the engine is less likely or unlikely to be started. Namely, it is possible to keep the vehicle moving using the output of the power storage device, without starting the engine.

Since the power supply of the heater is the external power supply, the heater cannot generate heat, during moving the vehicle. Thus, it is preferable to keep the shutter in the closed state, even after the vehicle starts moving, as described above, so as to curb reduction of the coolant temperature.

In the vehicle according to the above aspect of the invention, the controller may be configured to keep the shutter in the closed state until the temperature of the coolant becomes equal to or higher than the first threshold value, when the shutter has been driven so as to be placed in the closed state. Here, the heater is driven until the temperature of the coolant becomes equal to or higher than the first threshold value. Accordingly, the shutter can be kept in the closed state until driving of the heater is finished. With this arrangement, heat of the coolant is less likely or unlikely to be released to the outside of the vehicle, until driving of the heater is finished, and the temperature of the coolant can be easily elevated, through driving of the heater.

According to another aspect of the invention, a method of controlling a vehicle is provided. The vehicle includes a front grille, an engine, an engine compartment, a power storage device, a temperature sensor, a shutter, a heater, and a controller. The engine is a power source for moving the vehicle. The power storage device is a power source for a motor that moves the vehicle. The engine is housed in the engine compartment. The power storage device is adapted to be charged with electric power from an external power supply. The external power supply is provided outside the vehicle. The temperature sensor is configured to detect a temperature of a coolant of the engine. The shutter is disposed in a transfer pathway of air drawn into the engine compartment via the front grille, and the shutter is configured to be switched between a closed state and an open state. The closed state is a state in which the transfer pathway is closed, and the open state is a state in which the transfer pathway is open. The heater is configured to generate heat by receiving electric power from the external power supply, so as to raise the temperature of the coolant. The control method includes starting the engine by the controller when the temperature of the coolant is lower than a startup threshold value. The method also includes driving the heater by the controller until the temperature of the coolant becomes equal to or higher than a first threshold value when the temperature of the coolant is lower than the first threshold value. The first value is equal to or higher than the startup threshold value. The startup threshold being a temperature of the coolant at which the engine is started. The method further includes driving the shutter by the controller so as to place the shutter in the closed state while the heater is driven.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment of the invention will be described.

Figure 1:
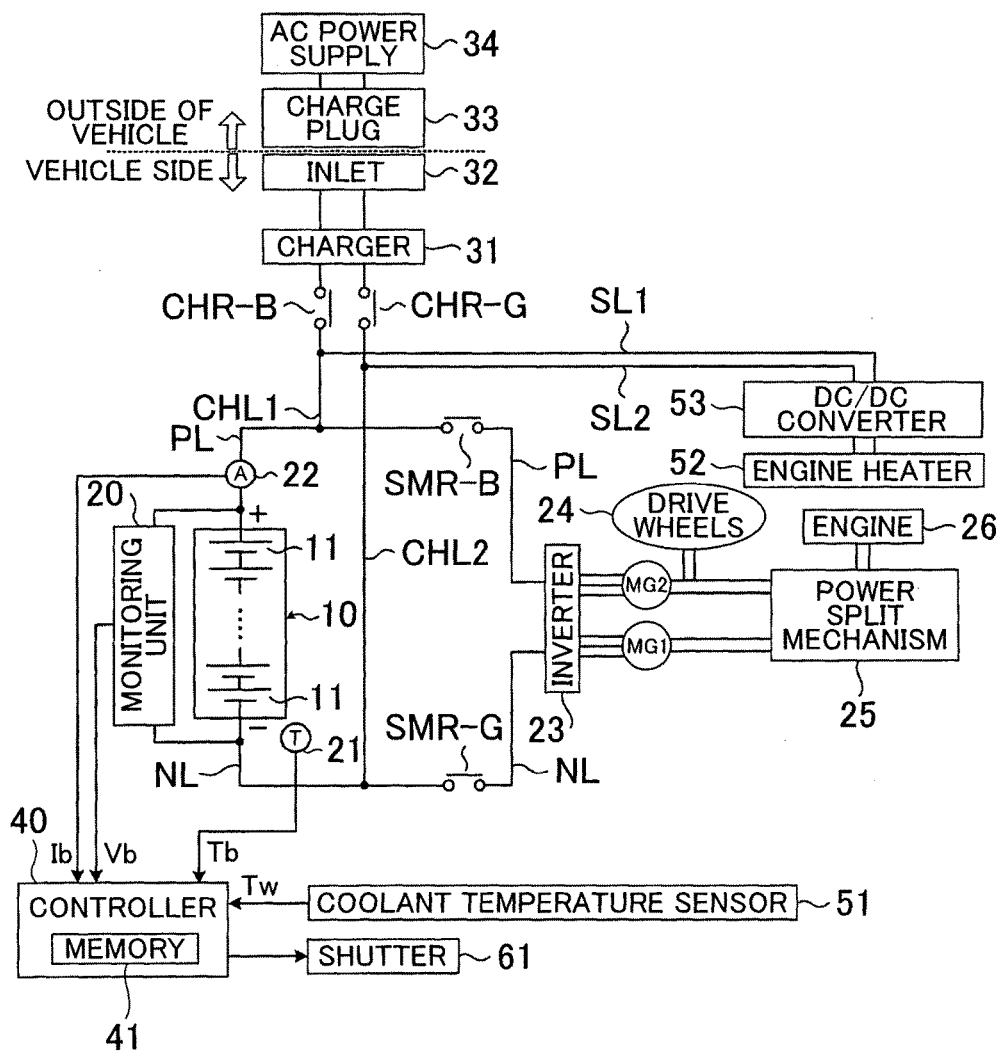
FIG. 1 is a view showing the configuration of a battery system.

FIG. 1 shows the configuration of a battery system of this embodiment. The battery system shown in FIG. 1 is provided on a vehicle (so-called hybrid vehicle). The vehicle includes a battery assembly (corresponding to the power storage device of the invention) and an engine, as power sources for moving the vehicle, as will be described later.

The battery assembly 10 has a plurality of unit cells 11 connected in series. As each of the unit cells 11, a secondary cell, such as a nickel-metal-hydride cell or a lithium-ion cell, may be used. Also, an electric double layer capacitor may be used in place of the secondary cell. While all of the unit cells 11 are connected in series in the battery assembly 10 of this embodiment, the battery assembly 10 may include two or more unit cells 11 connected in parallel.

A monitoring unit 20 detects a voltage value Vb of the battery assembly 10, and outputs the detection result to a controller 40. The monitoring unit 20 may detect a voltage value of each of the unit cells 11. A battery temperature sensor 21 detects the temperature (battery temperature) Tb of the battery assembly 10, and outputs the detection result to the controller 40. A current sensor 22 detects a current value Ib of the battery assembly 10, and outputs the detection result to the controller 40. In this embodiment, a positive value is used as a current value Ib when the battery assembly 10 is discharged, and a negative value is used as a current value Ib when the battery assembly 10 is charged.

A positive line PL is connected to a positive terminal of the battery assembly 10, and a negative line NL is connected to a negative terminal of the battery assembly 10. The battery assembly 10 is connected to an inverter 23, via the positive line PL and the negative line NL. A system main relay SMR-B is provided in the positive line PL, and a system main relay SMR-G is provided in the negative line NL.

The system main relays SMR-B, SMR-G are switched between ON and OFF, in response to a drive signal from the controller 40. The controller 40 receives a command indicative of turn-on of the ignition switch, and switches the system main relays SMR-B, SMR-G from OFF to ON, in response to the command. In this manner, the battery assembly 10 and the inverter 23 can be connected to each other, and the battery system shown in FIG. 1 is placed in a startup status (Ready-On). When the battery system is in the startup status, it is able to move the vehicle, as will be explained below.

The inverter 23 converts DC power generated from the battery assembly 10 into AC power, and delivers the AC power to a motor-generator MG2. The motor-generator MG2 receives the AC power from the inverter 23, and produces power (kinetic energy) using the AC power. The power produced by the motor-generator MG2 is transmitted to drive wheels 24, so as to move the vehicle.

Also, the motor-generator MG2 converts kinetic energy generated during braking of the vehicle into AC power, and delivers the AC power to the inverter 23. The inverter 23 converts the AC power from the motor-generator MG2, into DC power, and delivers the DC power to the battery assembly 10. In this manner, the battery assembly 10 is able to store regenerative power.

A power split mechanism 25 transmits the power of the engine 26 to the drive wheels 24, or transmits it to a motor-generator MG1. The motor-generator MG1 receives the power of the engine 26 and generates electric power (AC power). The AC power produced by the motor-generator MG1 is supplied to the motor-generator MG2 or supplied to the battery assembly 10, via the inverter 23. If the electric power produced by the motor-generator MG1 is supplied to the motor-generator MG2, the motor-generator MG2 produces power that can be used for driving the drive wheels 24. If the electric power produced by the motor-generator MG1 is supplied to the battery assembly 10, the battery assembly 10 can be charged with the electric power.

A booster circuit (not shown) may be provided in a current channel between the battery assembly 10 and the inverter 23. The booster circuit boosts or raises the output voltage of the battery assembly 10, and delivers electric power having the raised voltage to the inverter 23. Also, the booster circuit can lower the output voltage of the inverter 23, and deliver electric power having the lowered voltage to the battery assembly 10.

A charge line CHL1 is connected to the positive line PL between the positive terminal of the battery assembly 10 and the system main relay SMR-B. A charge line CHL2 is connected to the negative line NL between the negative terminal of the battery assembly 10 and the system main relay SMR-G. The charge lines CHL1, CHL2 are connected to a charger 31.

A charge relay CHR-B is provided in the charge line CHL1 that connects the charger 31 and the positive line PL. A charge relay CHR-G is provided in the charge line CHL2 that connects the charger 31 and the negative line NL. The charge relays CHR-B, CHR-G are switched between ON and OFF, in response to a drive signal from the controller 40.

An inlet (i.e., a connector) 32 is connected to the charger 31, via the charge lines CHL1, CHL2. A charge plug (i.e., a connector) 33 is connected to the inlet 32. Namely, the charge plug 33 can be connected to the inlet 32 or disconnected from the inlet 32. The charge plug 33 is connected to an AC power supply 34 via a cable. The charge plug 33 and the AC power supply 34 are provided outside the vehicle, separately from the vehicle. For example, a commercial power supply is used as the AC power supply 34.

When the charge plug 33 is connected to the inlet 32, and the charge relays CHR-B, CHR-G are switched ON, electric power can be supplied from the AC power supply 34 to the battery assembly 10, so as to charge the battery assembly 10. This type of charging will be called "external charging". The charger 31 converts AC power supplied from the AC power supply 34 into DC power, and delivers the DC power to the battery assembly 10. Also, the charger 31 can raise the output voltage of the AC power supply 34, and deliver the power having the raised voltage to the battery assembly 10. The operation of the charger 31 is controlled by the controller 40. When external charging is to be finished, the controller 40 switches the charge relays CHR-B, CHR-G from ON to OFF.

Through external charging, the SOC (State of Charge) of the battery assembly 10 can be increased. The SOC is the ratio of the current charging capacity to the full charging capacity. Since the process of external charging is publicly known, this process will not be described in detail. In the following, the process of external charging will be briefly described.

When the SOC of the battery assembly 10 reaches a target value, external charging can be finished. More specifically, the controller 40 monitors the SOC of the battery assembly 10 while external charging is being performed, and can finish external charging when the SOC becomes equal to or higher than the target value. As known in the art, the SOC of the battery assembly 10 can be calculated based on the voltage value Vb or the current value Ib.

When the amount of electric power supplied since external charging is started reaches a target amount of power, external charging can be finished. More specifically, the controller 40 keeps calculating the amount of electric power while external charging is performed, and can finish external charging when the calculated amount of power becomes equal to or larger than the target amount of power. The amount of electric power can be calculated based on the voltage value Vb or the current value Ib.

When external charging is conducted, the time (charging end time) at which external charging is to be finished, or the time (moving start time) at which the vehicle 100 starts moving may be set. When the charging end time or the moving start time is set, the controller 40 starts external charging so that the external charging will be finished at or before the charging end time or the moving start time. If a period of time it takes from the start of external charging to the end thereof is grasped, the time at which external charging is to be started can be specified.

If the current SOC at the time when external charging is started is calculated when external charging is performed so as to make the SOC of the battery assembly 10 equal to the target value, a difference between the current SOC and the target value can be calculated. On the basis of this difference, the period of time it takes from the start of external charging to the end thereof can be grasped, and the time at which external charging is to be started can be specified. On the other hand, when external charging is performed so as to make the amount of electric power equal to the target amount of power, the period of time it takes from the start of external charging to the end thereof can be grasped, based on the target amount of electric power. Then, the time at which external charging is to be started can be specified.

The system that performs external charging is not limited to the one shown in FIG. 1. Namely, any system that can charge the battery assembly 10, using a power supply (external power supply) provided outside the vehicle, may be used. For example, a DC power supply may be used as the external power supply, in addition to or in place of the AC power supply 34. Also, a system (so-called non-contact charging system) that supplies electric power without using a cable may be used. The non-contact charging system may employ a known arrangement or configuration as appropriate.

In the meantime, the charge line CHL1 may be connected to the positive line PL between the system main relay SMR-B and the inverter 23. Also, the charge line CHL2 may be connected to the negative line NL between the system main relay SMR-G and the inverter 23. In this case, when external charging is conducted, the charge relays CHR-B, CHR-G and the system main relays SMR-B, SMR-G are switched ON.

The controller 40 has a memory 41. The memory 41 stores certain information. While the memory 41 is incorporated in the controller 40, the memory 41 may be provided outside the controller 40. A coolant temperature sensor (corresponding to the temperature sensor of the invention) 51 detects the temperature Tw of the coolant of the engine 26, and outputs the detection result to the controller 40. The coolant of the engine 26 is used for cooling the engine 26.

An engine heater 52 is used for heating the engine 26, and heat generated from the engine heater 52 is transferred to the engine 26. The engine 26 may be heated by heating the coolant of the engine 26, or heating the engine oil. With the engine 26 thus heated, the temperature Tw of the coolant is elevated.

The engine heater 52 is only required to heat the engine 26, and may employ any known structure or arrangement as appropriate. For example, a device or element that generates heat when energized may be used as the engine heater 52. An external power supply (such as the AC power supply 34) is used as a power supply of the engine heater 52. Namely, when external charging is conducted, electric power is supplied from the external power supply to the engine heater 52, so as to drive the engine heater 52. Since the power supply of the engine heater 52 is the external power supply, the engine heater 52 cannot be driven during moving the vehicle.

Power supply lines SL1, SL2 are respectively connected to the charge lines CHL1, CHL2. More specifically, the power supply line SL1 is connected to the charge line CHL1 that connects the charge relay CHR-B and the positive line PL. Also, the power supply line SL2 is connected to the charge line CHL2 that connects the charge relay CHR-G and the negative line NL.

A DC/DC converter 53 is connected to the power supply lines SL1, SL2. When the charge relays CHR-B, CHR-G are ON, electric power can be supplied from the charger 31 to the DC/DC converter 53. The engine heater 52 is connected to the DC/DC converter 53, via the power supply lines SL1, SL2. The electric power whose voltage has been converted by the DC/DC converter 53 is supplied to the engine heater 52. The controller 40 controls the operation of the DC/DC converter 53.

Figure 2:
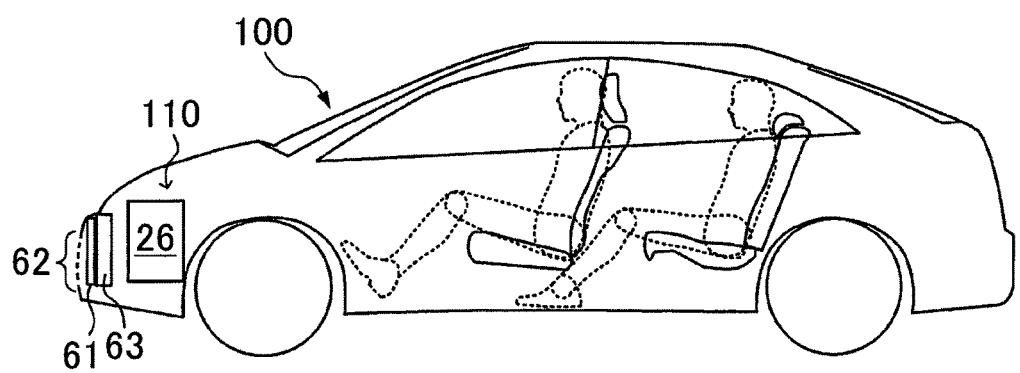
FIG. 2 is a view illustrating a location at which a shutter is disposed.

A shutter 61 is adapted to be switched between a closed state and an open state, in response to a drive signal from the controller 40. As shown in FIG. 2, a front grille 62 is provided at the front of the vehicle 100. The front grille 62 is used for drawing air from the front of the vehicle 100 into an engine compartment 110. The engine 26, a radiator 63, and the shutter 61 are housed in the engine compartment 110, and the coolant of the engine 26 flows through the radiator 63. The shutter 61 is disposed between the radiator 63 and the front grille 62, and is disposed in a transfer pathway of air drawn into the engine compartment 110 via the front grille 62.

Figure 3:
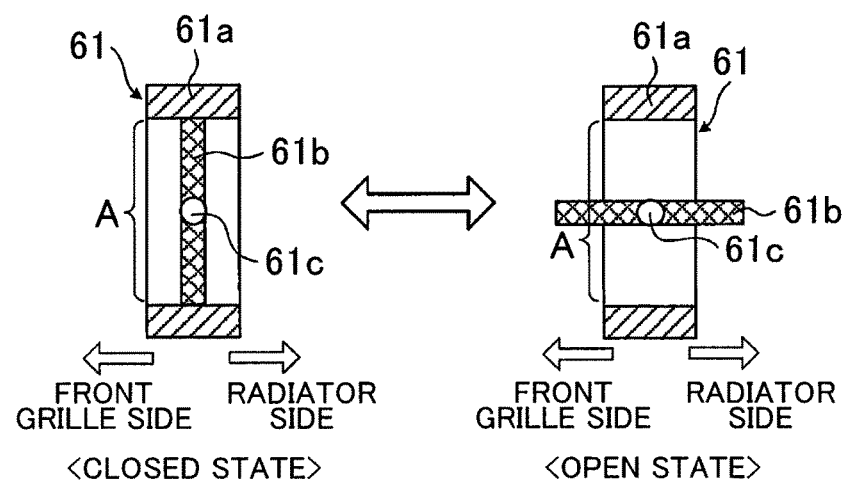
FIG. 3 is a schematic view showing the structure of the shutter.

FIG. 3 is a schematic view showing the structure of the shutter 61. The shutter 61 has a frame body 61a, a closure plate 61b, and a rotary shaft 61c. The rotary shaft 61c is coupled to a motor, and rotates when receiving power from the motor. The motor is driven by the controller 40. As a power supply of the motor, an auxiliary battery provided on the vehicle 100 may be used. The closure plate 61b is fixed to the rotary shaft 61c, so that the closure plate 61b rotates in accordance with rotation of the rotary shaft 61c.

As shown in FIG. 3, when the shutter 61 is placed in the closed state, the closure plate 61b blocks an opening A formed by the frame body 61a. Namely, the transfer pathway of air drawn into the engine compartment 110 via the front grille 62 is closed by the shutter 61. With the shutter 61 thus closed, air is less likely or unlikely to be transferred between the engine compartment 110 and the outside of the vehicle 100, via the front grille 62.

On the other hand, when the shutter 61 is placed in the open state, the closure plate 61b does not block the opening A. Namely, the transfer pathway of air drawn into the engine compartment 110 via the front grille 62 is opened by the shutter 61. With the shutter 61 thus opened, air is allowed to be transferred between the engine compartment 110 and the outside of the vehicle 100, via the front grille 62.

In the vehicle 100 of this embodiment, a CD (Charge Depleting) mode and a CS (Charge Sustaining) mode are set as moving modes. In the CD mode, the vehicle 100 preferentially moves using only the output of the battery assembly 10, in other words, moves using only the power of the motor-generator MG2. When the SOC of the battery assembly 10 is higher than a reference value SOC_ref, the vehicle 100 can move in the CD mode.

Figure 4:
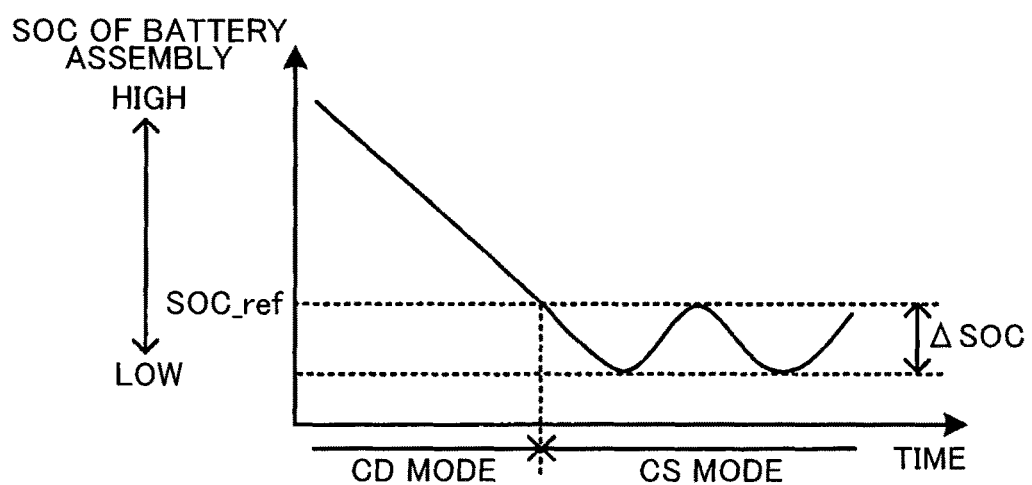
FIG. 4 is a view useful for explaining a CD mode and a CS mode.

In the CS mode, the vehicle 100 preferentially moves using both the output of the battery assembly 10 and the output of the engine 26. When the SOC of the battery assembly 10 is equal to or lower than the reference value SOC_ref, the vehicle 100 can move in the CS mode. The controller 40 sets the CD mode and the CS mode. FIG. 4 shows one example of the behavior of the SOC of the battery assembly 10 in the CD mode and the CS mode. In FIG. 4, the vertical axis indicates the SOC of the battery assembly 10, and the horizontal axis indicates time.

When the SOC of the battery assembly 10 is higher than the reference value SOC_ref, during moving the vehicle 100, the controller 40 sets the CD mode. On the other hand, when the SOC of the battery assembly 10 is equal to or lower than the reference value SOC_ref, during moving the vehicle 100, the controller 40 sets the CS mode. Accordingly, the vehicle 100 is kept moving in the CD mode while the SOC of the battery assembly 10 is higher than the reference value SOC_ref. While the vehicle 100 is moving in the CD mode, the SOC of the battery assembly 10 is reduced in accordance with moving the vehicle 100. When the SOC of the battery assembly 10 reaches the reference value SOC_ref, the moving mode of the vehicle 100 switches from the CD mode to the CS mode.

In the CS mode, both the battery assembly 10 and the engine 26 are used, and therefore, the SOC of the battery assembly 10 is less likely to be reduced. More specifically, charge and discharge of the battery assembly 10 are controlled, so that the SOC of the battery assembly 10 varies within a predetermined range ΔSOC that is equal to or lower than the reference value SOC_ref. The predetermined range ΔSOC is specified or defined by the upper-limit SOC and the lower-limit SOC, and the upper-limit SOC may be equal to the reference value SOC_ref, as shown in FIG. 4.

When the SOC of the battery assembly 10 reaches the upper-limit SOC, the battery assembly 10 is positively discharged, so that the SOC of the battery assembly 10 is reduced. When the SOC of the battery assembly 10 reaches the lower-limit SOC, the battery assembly 10 is positively charged, so that the SOC of the battery assembly 10 is increased. When the SOC of the battery assembly 10 is increased, regenerative power, or electric power generated by the motor-generator MG1 by use of the power of the engine 26, is used. In this manner, the SOC of the battery assembly 10 can be varied within the predetermined range ΔSOC.

In the CD mode and the CS mode, the vehicle 100 may be placed in a condition where it moves using only the power of the motor-generator MG2 (the output of the battery assembly 10), and a condition where it moves using the power of the engine 26 and the power of the motor-generator MG2 (the output of the battery assembly 10). Here, the required output for starting the engine 26 (which will be called "engine startup output") differs between the CD mode and the CS mode. More specifically, the engine startup output in the CD mode is higher than the engine startup output in the CS mode. The engine startup outputs in the CD mode and the CS mode may be set in advance. The engine startup output is specified by the rotational speed and torque of the engine 26.

When the output required to be produced by the vehicle 100 through operation of an accelerator pedal, for example, is lower than the engine startup output in the CD mode, the vehicle 100 moves (in the CD mode) using only the power of the motor-generator MG2 while the engine 26 is in a stopped state. When the output required to be produced by the vehicle 100 is equal to or higher than the engine startup output, on the other hand, the vehicle 100 moves (in the CD mode) using the power of the engine 26 and the motor-generator MG2.

The output required of the vehicle 100 is equal to or higher than the engine startup output in the CD mode, in a limited moving condition, such as WOT (Wide Open Throttle). Therefore, in the CD mode, the vehicle 100 preferentially moves using only the power of the motor-generator MG2.

When the output required of the vehicle 100 is lower than the engine startup output in the CS mode, the vehicle 100 moves (in the CS mode) using only the power of the motor-generator MG2 while the engine 26 is in a stopped state. When the output required of the vehicle 100 is equal to or higher than the engine startup output in the CS mode, on the other hand, the vehicle 100 moves (in the CS mode) using the power of the engine 26 and the motor-generator MG2.

The output required of the vehicle 100 is lower than the engine startup output in the CS mode, only in a limited driving condition, such as idling. Therefore, in the CS mode, the vehicle 100 preferentially moves using the power of the engine 26 and the motor-generator MG2.

Through external charging, the SOC of the battery assembly 10 becomes higher than the reference value SOC_ref. Thus, after external charging is finished, the vehicle can move in the CD mode.

While the moving mode of the vehicle 100 is switched between the CD mode and the CS mode in this embodiment, the invention is not limited to this arrangement. More specifically, the moving mode of the vehicle 100 may be switched between an EV (Electric Vehicle) mode and an HV (Hybrid Vehicle) mode. In the EV mode, the vehicle 100 moves only through charge/discharge of the battery assembly 10. The EV mode in which the engine 26 is not started is distinguished from the CD mode in which the engine 26 may be started. On the other hand, the HV mode is the same as the CS mode in that the SOC of the battery assembly 10 is varied within the predetermined range ΔSOC.

Figure 5:
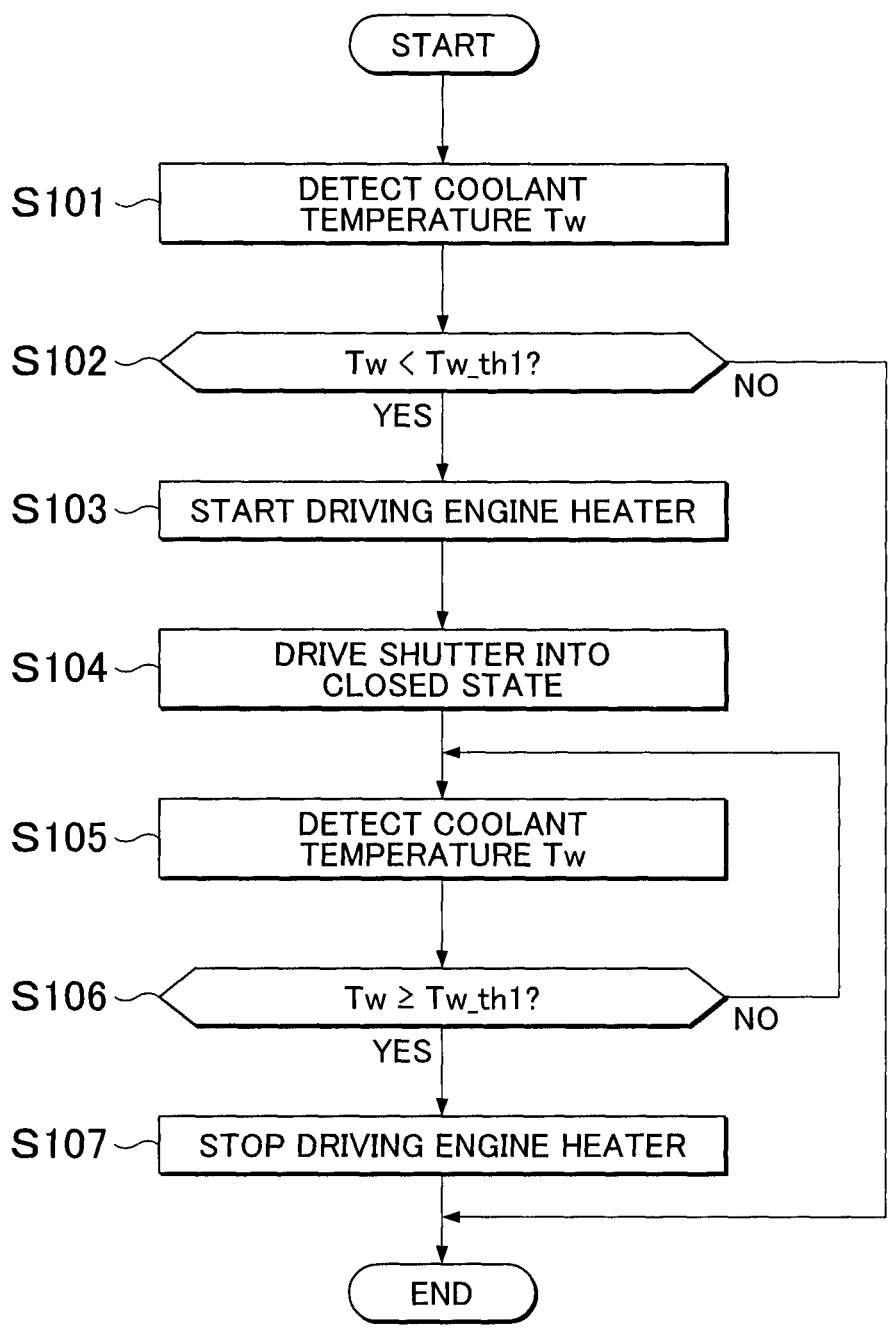
FIG. 5 is a flowchart illustrating drive control of an engine heater.

Next, a process performed when the engine heater 52 is driven will be described using the flowchart shown in FIG. 5. The process shown in FIG. 5 is carried out by the controller 40. When the process shown in FIG. 5 is started, the charge plug 33 is connected to the inlet 32, and the charge relays CHR-B, CHR-G are switched ON. Thus, the process shown in FIG. 5 is performed when external charging is conducted.

In step S101, the controller 40 detects the temperature Tw of the coolant, using the coolant temperature sensor 51. At this time, the coolant temperature Tw is influenced by the outside air temperature. For example, the coolant temperature Tw becomes closer to or equal to the outside air temperature, as a period of time for which the vehicle 100 is left standing without being driven becomes longer.

In step S102, the controller 40 determines whether the coolant temperature Tw detected in step S101 is lower than a first threshold value Tw_th1. The first threshold value Tw_th1 is equal to or higher than a startup threshold value Tw_th_eng used when the engine 26 is started, and may be set to a suitable value. To make it less likely to start the engine 26, it is preferable to set the first threshold value Tw_th1 to a value higher than the startup threshold value Tw_th_eng. The first threshold value Tw_th1 may be set in advance, and information that specifies the first threshold value Tw_th1 may be stored in the memory 41.

If the coolant temperature Tw is lower than the startup threshold value Tw_th_eng when the vehicle 100 starts moving or while the vehicle 100 is moving, the controller 40 starts the engine 26. Therefore, if the coolant temperature Tw becomes lower than the startup threshold value Tw_th_eng, the engine 26 is started, even though the vehicle 100 can move using only the output of the battery assembly 10, in the CD mode or EV mode.

When the coolant temperature Tw is equal to or higher than the first threshold value Tw_th1, the controller 40 finishes the process shown in FIG. 5. When the coolant temperature Tw is lower than the first threshold value Tw_th1, on the other hand, the controller 40 starts driving the engine heater 52 in step S103. More specifically, the controller 40 controls the operation of the charger 31 and the DC/DC converter 53, so as to supply electric power from the AC power supply 34 to the engine heater 52. As a result, the engine heater 52 can generate heat, so as to raise the coolant temperature Tw.

In step S104, the controller 40 drives the shutter 61 into the closed state. If the shutter 61 is in the open state before execution of step S104, the shutter 61 is switched from the open state to the closed state in step S104. If, on the other hand, the shutter 61 is already in the closed state, the shutter 61 is kept in the closed state.

In step S105, the controller 40 detects the coolant temperature Tw, using the coolant temperature sensor 51. In step S106, the controller 40 determines whether the coolant temperature Tw detected in step S105 is equal to or higher than the first threshold value Tw_th1. When the coolant temperature Tw is lower than the first threshold value Tw_th1, the controller 40 returns to step S105. Namely, the controller 40 waits until the coolant temperature Tw becomes equal to or higher than the first threshold value Tw_th1.

When the coolant temperature Tw is equal to or higher than the first threshold value Tw_th1, the controller 40 finishes driving of the engine heater 52 in step S107. More specifically, the controller 40 controls the operation of the DC/DC converter 53, so as to stop supplying electric power to the engine heater 52.

In the process shown in FIG. 5, when the coolant temperature Tw is lower than the first threshold value Tw_th1, the engine heater 52 starts being driven, and the shutter 61 is driven into the closed state. Here, the shutter 61 may be driven into the closed state while the engine heater 52 is being driven. After the engine heater 52 starts being driven, some period of time is generally required until the coolant temperature Tw becomes equal to or higher than the first threshold value Tw_th1. Accordingly, the shutter 61 may be driven into the closed state even during driving of the engine heater 52.

More specifically, a predetermined time may be set in advance, and the shutter 61 may be driven into the closed state when the predetermined time elapses from start of driving of the engine heater 52. The predetermined time is shorter than a length of time it takes until the coolant temperature Tw reaches the first threshold value Tw_th1 after the engine heater 52 starts being driven. The time it takes until the coolant temperature Tw reaches the first threshold value Tw_th1 after the engine heater 52 starts being driven depends on the coolant temperature Tw measured when the engine heater 52 starts being driven. The above-mentioned predetermined time may be set in view of this point. Thus, the shutter 71 may be driven into the closed state if the engine heater 52 is being driven. The engine heater 52 is being driven, for a period of time from the time at which driving of the engine heater 52 is started, to the time at which driving of the engine heater 52 is finished.

The process shown in FIG. 5 may be performed in any time period, as long as the vehicle 100 is in a condition where electric power can be supplied from the AC power supply 34 to the engine heater 52. When external charging is finished, the charge relays CHR-B, CHR-G are switched to OFF, and electric power cannot be supplied to the engine heater 52. Therefore, the process shown in FIG. 5 can be performed, in the time period prior to termination of external charging.

Since the process shown in FIG. 5 is performed when external charging is conducted, as described above, the coolant temperature Tw can be made equal to or higher than the first threshold value Tw_th1, through the process shown in FIG. 5, when external charging ends. After the end of external charging, the vehicle 100 starts moving in the CD mode. Accordingly, the coolant temperature Tw can be made equal to or higher than the first threshold value Tw_th1, through the process shown in FIG. 5, when the vehicle 100 starts moving in the CD mode. Since the first threshold value Tw_th1 is equal to or higher than the startup threshold value Tw_th_eng, the engine 26 is prevented from being started because of the coolant temperature Tw lower than the startup threshold value Tw_th_eng, when the vehicle 100 starts moving in the CD mode.

According to the process shown in FIG. 5, when the engine heater 52 is driven, the shutter 61 is placed in the closed state. Therefore, heat of the coolant heated by the engine heater 52 is less likely or unlikely to be released to the outside of the vehicle 100 after passing through the opening A of the shutter 61 and the front grille 62. As a result, the coolant temperature Tw can be easily elevated through driving of the engine heater 52. Also, electric power supplied to the engine heater 52 is less likely or unlikely to be increased so as to raise the coolant temperature Tw. Namely, the coolant temperature Tw can be made equal to or higher than the first threshold value Tw_th1, even if excessively large electric power is not supplied to the engine heater 52.

Figure 6:
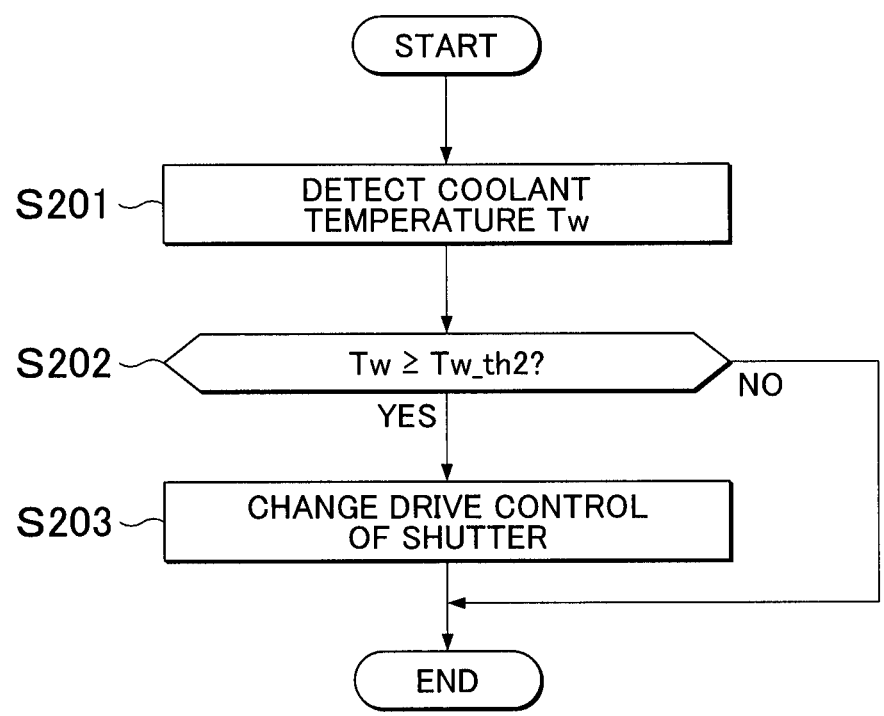
FIG. 6 is a flowchart illustrating drive control of the shutter.

Next, drive control of the shutter 61 will be described using the flowchart shown in FIG. 6. The process shown in FIG. 6 is repeatedly executed at given intervals, and is carried out by the controller 40. The process shown in FIG. 6 is performed when the shutter 61 is driven into the closed state through the process shown in FIG. 5.

In step S201, the controller 40 detects the coolant temperature Tw, using the coolant temperature sensor 51. In step S202, the controller 40 determines whether the coolant temperature Tw detected in step S201 is equal to or higher than a second threshold value Tw_th2. The second threshold value Tw_th2 is higher than the above-described first threshold value Tw_th1. The second threshold value Tw_th2 may be set in advance, and information that specifies the second threshold value Tw_th2 may be stored in the memory 41.

When the coolant temperature Tw is lower than the second threshold value Tw_th2, the controller 40 finishes the process shown in FIG. 6. In this case, the shutter 61 is kept in the closed state. Namely, the shutter 61 is kept in the closed state until the coolant temperature Tw becomes equal to or higher than the second threshold value Tw_th2. On the other hand, when the coolant temperature Tw is equal to or higher than the second threshold value Tw_th2, the controller 40 changes drive control of the shutter 61 in step S203. For example, if the engine 26 is started during moving the vehicle 100 in the CS mode, the coolant temperature Tw may become equal to or higher than the second threshold value Tw_th2.

In step S203, the controller 40 switches drive control of the shutter 61 from control for keeping the shutter 61 in the closed state to control for assuring moving stability of the vehicle 100. In the drive control of the shutter 61 for assuring moving stability, driving of the shutter 61 is controlled according to moving conditions (e.g., the moving speed) of the vehicle 100, so as to generate lift force or downforce. After drive control of the shutter 61 is changed, the shutter 61 may be switched from the closed state to the open state, or may be kept in the closed state.

According to the processes shown in FIG. 5 and FIG. 6, even if driving of the engine heater 52 is finished, step S203 shown in FIG. 6 is not executed until the coolant temperature Tw becomes equal to or higher than the second threshold value Tw_th2. Namely, even after driving of the engine heater 52 is finished, the shutter 61 is kept in the closed state until the coolant temperature Tw becomes equal to or higher than the second threshold value Tw_th2. Therefore, the shutter 61 may be kept in the closed state, even after external charging ends and the vehicle 100 starts moving (in the CD mode). In this case, the process shown in FIG. 6 is also performed after external charging ends, and the vehicle 100 starts moving.

When the vehicle 100 starts moving in the CD mode, wind caused by moving is generated. With the shutter 61 placed in the closed state, the wind caused by moving is less likely or unlikely to enter the engine compartment 110, and the coolant temperature Tw is less likely or unlikely to be reduced due to the wind. Accordingly, during moving in the CD mode, the coolant temperature Tw is less likely or unlikely to be lower than the startup threshold value Tw_th_eng, and the engine 26 is less likely or unlikely to be started. In other words, it is possible to keep the vehicle moving in the CD mode, without starting the engine 26.

In this embodiment, since the power supply of the engine heater 52 is only the external power supply (such as the AC power supply 34), the engine heater 52 cannot be driven during moving the vehicle 100. Thus, it is preferable to keep the shutter 61 in the closed state even during moving in the CD mode, so as to curb or prevent reduction of the coolant temperature Tw.

In step S202 shown in FIG. 6, the first threshold value Tw_th1 explained in the process of FIG. 5 may be used in place of the second threshold value Tw_th2. Namely, in step S202, it may be determined whether the coolant temperature Tw is equal to or higher than the first threshold value Tw_th1.

In this case, when driving of the engine heater 52 is finished, the operation of step S203 is performed. Since steps S201, S202 shown in FIG. 6 are the same as step S105, S106 shown in FIG. 5, the operation of step S203 shown in FIG. 6 may be performed along with the operation of step S107 shown in FIG. 5. In this case, the process shown in FIG. 6 is performed when external charging is conducted.

The shutter 61 is kept in the closed state until driving of the engine heater 52 is finished. Therefore, heat of the coolant heated by the engine heater 52 is less likely or unlikely to be released to the outside of the vehicle 100, until driving of the engine heater 52 is finished, and the coolant temperature Tw can be easily elevated.

Figure 7:
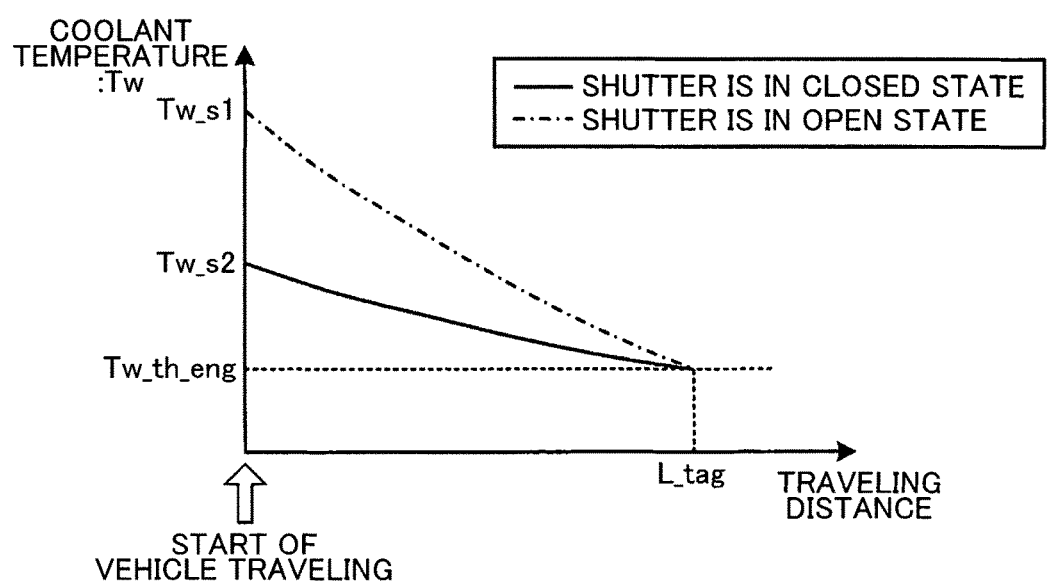
FIG. 7 is a view showing changes in the temperature of a coolant during moving, when the shutter is in a closed state and an open state.

FIG. 7 shows one example of changes in the coolant temperature Tw when the vehicle 100 moves in a certain moving pattern, in the case where the shutter 61 is in the closed state and the case where the shutter 61 is in the open state. In FIG. 7, the vertical axis indicates the temperature Tw of the coolant, and the horizontal axis indicates the moving distance.

As shown in FIG. 7, in either of the case where the shutter 61 is in the closed state and the case where the shutter 61 is in the open state, the coolant temperature Tw is reduced in accordance with moving the vehicle 100. However, when the shutter 61 is in the open state, the coolant temperature Tw is more likely to be reduced, as compared with the case where the shutter 61 is in the closed state. It should be appreciated that the behavior of the coolant temperature Tw when it is reduced varies according to the moving speed of the vehicle 100 and the outside air temperature.

When a target distance L_tag is to be secured as the moving distance in the CD mode, the engine 26 can be prevented from being started during moving in the CD mode, if the coolant temperature Tw measured when the moving distance reaches the target distance L_tag is equal to or higher than the startup threshold value Tw_th_eng. As shown in FIG. 7, when the vehicle moves with the shutter 61 placed in the open state, the coolant temperature Tw measured when the moving distance reaches the target distance L_tag becomes equal to the startup threshold value Tw_th_eng if the temperature Tw measured when the vehicle starts moving is equal to a temperature Tw_s1. On the other hand, when the vehicle moves with the shutter 61 placed in the closed state, the coolant temperature Tw measured when the moving distance reaches the target distance L_tag becomes equal to the startup threshold value Tw_th_eng if the temperature Tw measured when the vehicle starts moving is equal to a temperature Tw_s2.

As is understood from FIG. 7, the temperature Tw_s2 is lower than the temperature Tw_s1. Therefore, when the vehicle moves with the shutter 61 placed in the closed state, the temperature Tw measured when the vehicle 100 starts moving can be reduced to be lower than the temperature Tw_s1. Therefore, when the engine heater 52 is driven, the temperature Tw need not be elevated too much. If the temperature Tw is not elevated too much, electric power supplied to the engine heater 52 can be reduced.

The first threshold value Tw_th1 may be set in view of the above-described point. For example, the temperature Tw_s2 shown in FIG. 7 may be set as the first threshold value Tw_th1. According to the process shown in FIG. 6, the shutter 61 is kept in the closed state until the temperature Tw becomes equal to or higher than the second threshold value Tw_th2. Therefore, when the temperature Tw is kept reduced as shown in FIG. 7, the shutter 61 can be kept in the closed state while the vehicle is moving in the CD mode over the target distance L_tag.

While the shutter 61 is kept in the closed state until the coolant temperature Tw becomes equal to or higher than the second threshold value Tw_th2, in the process shown in FIG. 6, the invention is not limited to this arrangement. A condition under which the shutter 61 is kept in the closed state may be set as appropriate. The shutter 61 may be driven into the closed state during driving of the engine heater 52, so that heat of the coolant heated by the engine heater 52 is less likely or unlikely to be released to the outside of the vehicle 100. Thus, while the shutter 61 is placed in the closed state, release of the heat of the coolant heated by the engine heater 52 to the outside of the vehicle 100 can be curbed or prevented. An operation to keep the shutter 61 in the closed state will be described below.

The shutter 61 can be kept in the closed state while the vehicle 100 is moving in the CD mode. Namely, the shutter 61 can be kept in the closed state until the moving mode is switched from the CD mode to the CS mode. During moving in the CD mode, the engine 26 may be started, depending on the output required of the vehicle 100. Even if the engine 26 is temporarily started as in this case, the shutter 61 is kept in the closed state, so that release of the heat of the coolant to the outside of the vehicle 100 can be curbed or prevented.

The invention claimed is:

1. A vehicle comprising:
   a front grille;
   an engine that is a power source for moving the vehicle;
   an engine compartment in which the engine is housed;
   a power storage device that is a power source for a motor that moves the vehicle, the power storage device being adapted to be charged with electric power from an external power supply, the external power supply being provided outside the vehicle;
   a temperature sensor configured to detect a temperature of a coolant of the engine;
   a shutter that is disposed in a transfer pathway of air drawn into the engine compartment via the front grille of the vehicle, the shutter being configured to be switched between a closed state and an open state, the closed state being a state in which the transfer pathway is closed, the open state being a state in which the transfer pathway is open;
   a heater configured to generate heat by receiving electric power from the external power supply so as to raise the temperature of the coolant; and
   a controller configured to control drive of the shutter and the heater, wherein
   the vehicle is able to move in a first mode and a second mode, the first mode being a mode in which the vehicle moves using the power storage device, when an SOC of the power storage device is higher than a reference value, the second mode being a mode in which the vehicle moves using the engine and the power storage device, so that the SOC varies within a predetermined range that is equal to or lower than the reference value, when the SOC is equal to or lower than the reference value, the heater is controlled to be driven only by electric power from the external power supply, the controller is configured to start the engine when the temperature of the coolant is lower than a startup threshold value used when the engine is started, and when charging of the power storage device with electric power from the external power supply is conducted, drive the heater by electric power from the external power supply until the temperature of the coolant becomes equal to or higher than a first threshold value when the temperature of the coolant is lower than the first threshold value, the first threshold value being equal to or higher than the startup threshold value, and drive the shutter so as to place the shutter in the closed state while the heater is driven, and the controller configured to keep the shutter in the closed state until the vehicle starts moving, and control the shutter to be in the closed state even while the vehicle is moving, during moving the vehicle in the first mode after the power storage device is charged with electric power from the external power supply.

2. The vehicle according to claim 1, wherein the controller is configured to keep the shutter in the closed state until the temperature of the coolant becomes equal to or higher than a second threshold value, when the shutter has been driven so as to be placed in the closed state, the second threshold value is higher than the first threshold value.

3. The vehicle according to claim 1, wherein the controller is configured to keep the shutter in the closed state until the temperature of the coolant becomes equal to or higher than the first threshold value, when the shutter has been driven so as to be placed in the closed state.

* * * * *